Jan. 27, 1953  G. A. LYON  2,626,838
WHEEL COVER
Filed Jan. 20, 1947
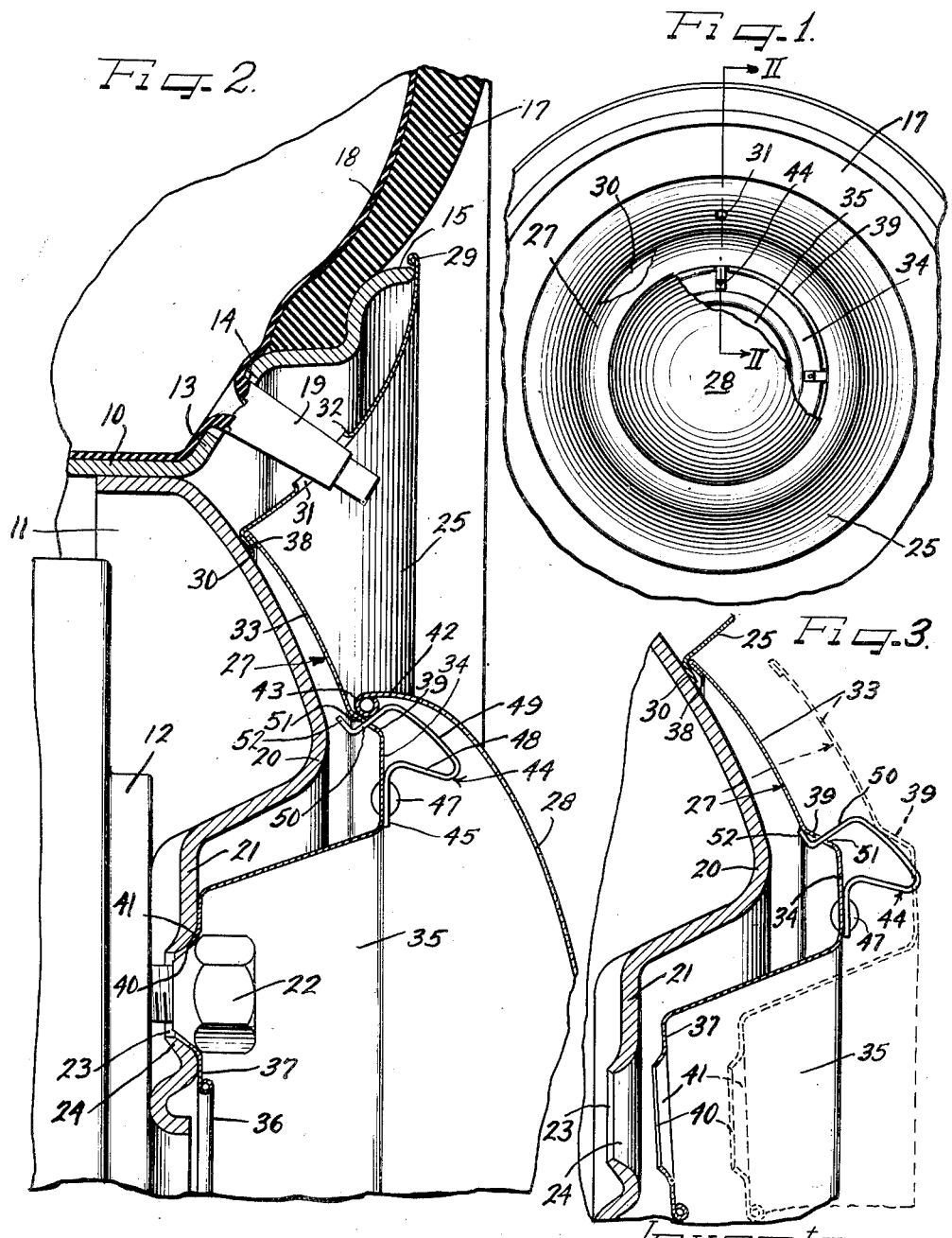
Inventor
GEORGE ALBERT LYON
by [signature] Attys.

Patented Jan. 27, 1953

2,626,838

UNITED STATES PATENT OFFICE 2,626,838

WHEEL COVER

George Albert Lyon, Detroit, Mich.

Application January 20, 1947, Serial No. 723,172

14 Claims. (Cl. 301—37)

This invention relates to improvements in wheel structures and more particularly to improvements in vehicle wheel structures and a novel cover assembly therefor.

Where it is desired to attach a one-piece or an integral composite wheel cover to a vehicle wheel by means of the bolts by which the wheel is secured to the axle of the vehicle, a problem is encountered in effecting registration of the clearance aperture in the radially outer portion of the cover with the valve stem. This comes about because in the assembly of the tire rim with the wheel body, the relative angular disposition of the valve stem aperture in the tire rim with respect to the bolt apertures in the wheel body may vary considerably, due to the standard practice involved in assembling the tire rim and the wheel body.

It is accordingly an important object of the present invention to provide in a wheel structure an improved cover assembly which is secured in place on the wheel by means of the bolts by which the wheel is secured to the axle of the vehicle and which cover assembly is self-adjustable with respect to variations in relative disposition of the valve stem and the bolt apertures.

Another object of the invention is to provide an improved cover assembly for vehicle wheels which is readily separable from the wheel.

Another object of the invention is to provide a novel cover assembly for vehicle wheels and which cover assembly comprises a plurality of relatively rotatably adjustable cover components which when mounted on the wheel are strongly secured against relative movement.

It is a further object of the invention to provide improved cover retaining means for a wheel cover assembly.

Still another object of the invention is to provide improved retaining spring means for a vehicle cover assembly.

According to the general features of the present invention, there is provided a wheel structure including a tire rim and a body part, the tire rim having a valve stem aperture and the body part having a plurality of centrally disposed bolt-on apertures, a cover assembly including a trim ring member extending in concealing relation to the tire rim and having its inner margin provided with a reinforcing flange resting against the wheel body, and an annular cover retaining ring member clampingly engaging the inner marginal flange of the trim ring member and having a central apertured portion with the apertures thereof registering with the bolt apertures of the wheel body, the trim ring member having a valve stem aperture therein registering with the valve stem aperture in the tire rim and being rotatably adjustable relative to the retaining ring for effecting such registration of the valve stem apertures.

According to other general features of the invention, the retaining ring member has a plurality of retaining means thereon which are engageable by a hub cap cover member in separable relationship.

According to still other general features of the invention, the retaining ring member is of a generally convex cross section and is flexibly tensioned to a somewhat less than original convexity when secured in place by the wheel attaching bolts.

According to further general features of the invention, the flexibly tensioned retaining ring member has thereon a plurality of spring clips which are interengaged with the retaining ring member under tension and are arranged to follow the changes in cross sectional contour of the retaining ring member as the same is flexed in fully mounted position on the wheel.

According to additional general features of the invention, an improved vehicle wheel cover is provided including a trim ring member, a retaining ring member separably clampingly engageable with the trim ring member to secure the same in place on a vehicle wheel, the retaining ring member having means thereon for supporting a hub cap cover member, and a hub cap cover member separably engageable with said retaining means on the retaining ring member.

Other objects, features and advantages of the present invention will be readily apparent from the following detailed description of a preferred embodiment thereof taken in conjunction with the accompanying drawings, in which:

Figure 1 is a fragmentary side elevational view of a wheel structure embodying the features of the invention and with certain parts broken away to reveal details of the structure therebehind;

Figure 2 is an enlarged radial sectional view taken substantially along the line II—II of Figure 1, and Figure 3 is a fragmentary sectional view taken in substantially the plane of Figure 2 and showing the retaining ring portion of the cover assembly in various stages of assembly.

As shown on the drawings:

A vehicle wheel with which the present invention is adapted to be utilized comprises a tire rim 10 and a wheel body 11 secured concentrically to the base flange of the tire rim, and affording a load-sustaining support for the tire rim with respect to a vehicle axle of which a portion, identified at 12, is shown in Figure 2. The tire rim is of the conventional drop center, multi-flanged type, having the usual outer side flange 13 formed with a valve stem opening 14. The outer margin of the tire rim terminates in a flange 15. A pneumatic tire 17 supported by the tire rim 10 has an inflatable tube 18 therein equipped with a valve stem 19 which projects through the valve stem aperture 14.

The wheel body 11 which may be formed as a sheet metal stamping of appropriate gauge, has the usual generally axially outwardly protruding annular reinforcing bulge or nose 20 defining an axially inwardly dished portion providing a central bolt-on flange 21. To receive cap screws or bolts 22 by which the wheel is secured to the axle part 12, the bolt-on flange 21 is customarily formed with an annular series of bolt holes 23. Axially inwardly projecting annular flanges 24 about the bolt holes 23 afford reinforcement and provide tapered seats for the bolts 22.

Since the outer side of the wheel is inherently of a relatively unattractive appearance due to the functional angularity of the tire rim and the particular utilitarian construction of the central part of the wheel body, with the attendant grooves, recesses and crevices which are notoriously dirt collecting, a cover is provided for ornamentally and protectively concealing the outer side of the wheel.

According to the present invention, the cover is constructed of separably assembled principal components to be separably assembled with the wheel, and to be properly adjustable with respect to the possibly variably relatively disposed portions of the wheel assembly. To this end, the cover preferably comprises a trim ring portion or member 25, a retaining portion or member 27 and a hub cap cover member 28, all of which are adapted to be separably assembled and to be separably mounted on the wheel.

The trim ring cover member 25 is preferably formed from suitable sheet material and has a magnitude and extent to conceal the tire rim 10 entirely and preferably also the juncture of the tire rim and the wheel body portion 11. Moreover, the cover member 25 is preferably formed so that when placed on the wheel, it appears in general simulation of a radially inward extension of the side wall of the tire 17. To this end, the trim ring cover member 25 is preferably formed on a generally smoothly convex cross sectional contour with the outer margin thereof formed with a reinforcing bead 29 or the like, which circles the tire rim terminal flange 15 and at least to a substantial extent conceals the juncture of the tire rim and the tire.

From the marginal reinforcing bead 29, the trim ring member 25 extends generally axially and radially curvingly inwardly toward engagement at an inner margin with the wheel body 11 at a point spaced radially inwardly from the juncture of the tire rim and the wheel body. By preference, the inner margin of the trim ring cover member 25 is formed with a generally radially inwardly and slightly axially outwardly extending, divergent, reinforcing flange 30 which conforms to the opposing surface of the wheel body and is adapted in full assembly to seat thereagainst.

An aperture 31 in the trim ring cover member, defined by an inwardly directed annular reinforcing and finishing flange 32, affords clearance for projection therethrough of the valve stem 19.

The retaining ring member 27 is constructed and arranged to be secured separably to the wheel and to secure the trim ring cover member 25 in place on the wheel, and also to support the hub cap cover member 28 separably. To this end, the retaining member 27 is formed from suitable gauge sheet metal and includes a radially outer wheel-body-opposing and trim-ring-securing portion 33, an intermediate generally axially outwardly extending annular reinforcing hump 34, and a generally axially inwardly dished central portion 35 providing a bolt-on flange 37. The central part of the bolt-on flange 37 may be formed with a large aperture marginally reinforced as by a bead 36. In general, therefore, the retaining ring member 27 conforms to the nose portion 20 and the central bolt-on flange portion 21 of the wheel body and, in effect, serves as a false front therefor.

At its radially outer margin, the outer portion 33 of the retaining member is preferably smoothly finished and reinforced by an inwardly return bent flange 38 which is adapted in assembly to engage in the juncture groove between the trim ring body and the seating flange 30 and clamp the flange 30 against the wheel body. In assembly, the marginally reinforced retaining member portion 33 fits closely in the juncture of the trim ring body and the flange 30 and appears substantially as a diverging portion of the trim ring. Considered in another way, of course, the trim ring 25 appears as a divergent continuation of the outer portion 33 of the retaining member.

From its radially outer edge, the outer portion 33 of the retaining member extends on a slight convex curvature to an integral juncture with the axially inner margin of a generally frusto-conically shaped, radially and axially outwardly facing, narrow annular shoulder 39 at the radially outer side of the bulge portion 34 of the retaining member.

The bolt-on flange 37 of the retaining member is conformed to seat against the bolt-on flange 21 of the wheel body, and has bolt apertures 40 defined by reinforcing and bolt seating flanges 41 generally complementary to the bolt aperture defining flanges 24 of the wheel body bolt-on flange.

The primary or unassembled formation of the retaining member 27 is preferably more prominently convex, as shown in Figure 3, than in the finally assembled relationship with the wheel, as shown in Figure 2. This results in the radially outer portion 33 of the retaining member 27 being placed under clamping tension as an incident to bolting of the retaining member onto the wheel. Thus, having reference to Figure 3, in the preliminary assembly the radially outer reinforcing flange 38 of the outer retaining portion 33 initially engages the trim ring inner marginal flange 30 before the bolt-on flange 37 of the retaining member engages the bolt-on flange 21 of the wheel body. Hence, by forcing the retaining member 27 inwardly until the bolt-on flange 37 seats against the bolt-on flange 21 causes the outer retaining portion 33 to be flexed and placed under clamping tension. The clamping tension thus created is of substantial advantage in that a strong frictional clamping grip is established against the trim ring reinforcing flange 30 and this holds the trim ring cover member 25 relatively firmly against rotation or slipping which might tend to distort the valve stem 19 extending therethrough.

The hub cap cover member 28 is adapted to be mounted directly upon the retaining member 27 in snap-on pry-off relationship. To this end, the hub cap member 28 is formed with a generally axially inwardly extending annular marginal portion 42 having its extremity curled inwardly to provide a reinforcing bead 43. The inner circumference of the bead 43 is predetermined to seat against the axially inner portion of the shoulder 39 of the retaining member.

For retaining the hub cap cover member 28, the retaining member 27 is provided with means such as a plurality of generally goose-neck shaped spring retaining clips 44. There is a series of the clips 44 mounted on the reinforcing bulge 34 in symmetrically spaced relation. Four of the clips 44 have been found satisfactory in practice. Each of the clips 44 is formed with a base flange 45 which is adapted to be secured as by means of a rivet 47 to the preferably flattened peak of the bulge 34. From the flange 45 extends a generally axially outwardly and slightly radially inwardly tilted goose-neck flange 48 from which projects a generally radially outwardly and axially inwardly extending cam flange 49 leading to and merging on a rounded contour with a generally axially inwardly and slightly radially inwardly extending retaining shoulder flange 50. The latter flange is disposed to project through a clearance aperture 51 formed in the shoulder 39. The flanges 51 within the apertures 51 keep the clips against any tendency to rotate out of position about the axis of the respective securing rivets 47.

Through this arrangement, the hub cap cover member 28 is adapted to be pressed axially inwardly with the reinforcing marginal bead 43 in camming relation to the cam flanges 49 of the clips until the bead 43 passes the hump-like juncture of the cam flange with the retaining shoulder flange 50 by yielding of the clip, whereupon the beaded margin of the hub cap snaps against the shoulder 39 and the retaining shoulder 50 of the clip snaps into retaining relation to the bead and holds the bead firmly in position on the shoulder 39.

By preference each of the retaining clips 44 is mounted on the hump 34 of the retaining member under preloaded tension which would ordinarily cause the retaining shoulder flange 50 of the clip to spring out of the respective clearance aperture 51. Therefore, the terminal of the retaining shoulder flange is formed with a generally radially outwardly and slightly axially inwardly extending stop flange 52 which is adapted to engage the axially inner surface of the retaining member 27 at the radially outer side of the respective clearance aperture 51. Hence, when the retaining clips 44 are inactive, the preloaded tension thereof draws the respective stop flanges 52 against the opposing surface of the retaining member. When the hub cap cover member 28 is in place, the clips are placed under compression, substantially as shown in Figure 2, and the retaining shoulder flange 50 may be somewhat inwardly deflected. By thus preloading the clips 34, a substantially firmer and more positive grip is maintained upon the margin of the hub cap cover member.

Another advantage of equipping the clips 44 with the stop flanges 52 and having the clips under preloaded tension resides in the capability of the clips thereby following any deflectional changes in the contour of the retaining member 27 as it is mounted under tension as heretofore described. Thus, the clips at all times maintain their proper operational positions.

When it is desired to remove the hub cap cover member 28, that may readily be accomplished by applying and manipulating a pry-off tool between the bead 43 and the opposing surface of the retaining member portion 33.

Where, for any reason it is desired to dispense with the trim ring cover member 25, it will be apparent that this can be done since the retaining member 27 will engage directly and snugly on the wheel body at the reinforced margin 38 under the tensioned assembly of the retaining member with the wheel.

An advantage of the separable relationship of the trim ring cover member 25 and the retaining member 27, in addition to the advantage of relative rotary adjustment for accommodating the valve stem 19 and the bolt apertures 23 of the wheel body resides in that should the trim ring cover member become damaged, it can be readily replaced without going to the expense of replacing the entire cover assembly. Similarly, the hub cap cover member 28 can be replaced as desired.

An advantage of having the cover assembly removably mounted on the wheel is in the ready interchangeability of the cover with respect to different wheels so that an automobile, for example, equipped with this type of cover may have as equipment only four of the cover assemblies which can be readily interchanged with the spare or replacement wheels as required. In fact, replacement of the cover assembly is adapted to be effected virtually simultaneously with replacement of the wheel, since the same bolts which hold the wheel in place also hold the cover on the wheel.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a wheel structure including a tire rim and a body part, the tire rim having a valve stem aperture and the body part having a plurality of centrally disposed bolt-on apertures, a cover assembly including a trim ring member extending in concealing relation to the tire rim and having its inner margin provided with a reinforcing flange resting against the wheel body, and an annular cover retaining ring member clampingly engaging the inner marginal flange of the trim ring member and having a central apertured portion with the apertures thereof registering with the bolt apertures of the wheel body, the trim ring member having a valve stem aperture therein registering with the valve stem aperture in the tire rim and being rotatably adjustable relative to the retaining ring for effecting such registration of the valve stem aperture.

2. In a wheel structure including a tire rim and a body part, the tire rim having a valve stem aperture and the body part having a plurality of centrally disposed bolt-on apertures, a cover assembly including a trim ring member extending in concealing relation to the tire rim and having its inner margin provided with a reinforcing flange resting against the wheel body, and an annular cover retaining ring member clampingly engaging the inner marginal flange of the trim ring member and having a central apertured portion with the apertures thereof registering with the bolt apertures of the wheel body, the trim ring member having a valve stem aperture therein registering with the valve stem aperture in the tire rim and being rotatably adjustable relative to the retaining ring for effecting such registration of the valve stem aperture, the retaining ring member having a plurality of hub cap cover retaining means thereon which are engageable by a hub cap cover member in separable relationship.

3. In a wheel structure including a tire rim and a body part, the tire rim having a valve stem aperture and the body part having a plurality of centrally disposed bolt-on apertures, a cover assembly including a trim ring member extending in concealing relation to the tire rim and having its inner margin provided with a reinforcing flange resting against the wheel body, and an annular cover retaining ring member clampingly engaging the inner marginal flange of the trim ring member and having a central apertured portion with the apertures thereof registering with the bolt apertures of the wheel body, the trim ring member having a valve stem aperture therein registering with the valve stem aperture in the tire rim and being rotatably adjustable relative to the retaining ring for effecting such registration of the valve stem aperture, the retaining ring member being of a generally convex cross section and being flexibly tensioned to a somewhat less than original convexity when secured in place by the wheel attaching bolts.

4. In a wheel structure including a tire rim and a body part, the tire rim having a valve stem aperture and the body part having a plurality of centrally disposed bolt-on apertures, a cover assembly including a trim ring member extending in concealing relation to the tire rim and having its inner margin provided with a reinforcing flange resting against the wheel body, and an annular cover retaining ring member clampingly engaging the inner marginal flange of the trim ring member and having a central apertured portion with the apertures thereof registering with the bolt apertures of the wheel body, the trim ring member having a valve stem aperture therein registering with the valve stem aperture in the tire rim and being rotatably adjustable relative to the retaining ring for effecting such registration of the valve stem aperture, the retaining ring member being of a generally convex cross section and being flexibly tensioned to a somewhat less than original convexity when secured in place by the wheel attaching bolts, the retaining ring member having thereon a plurality of spring clips which are interengaged with the retaining ring member under tension and are arranged to follow the changes in cross sectional contour of the retaining ring member as the same is flexed to fully mounted position on the wheel.

5. In combination a wheel cover structure of the character described, an annular member of generally convex cross section affording an annularly humped formation and formed from resiliently flexible sheet metal, the member being adapted to be placed under resilient tension by the flexure of a portion thereof to vary the contour of the humped formation, and a spring clip carried by said member for attachment of a cover member to said first mentioned member, said spring clip being interengaged with said first mentioned member under preloaded tension and conformable to variations in the contours of said first mentioned member resulting from the flexure thereof.

6. In a wheel structure including a tire rim and a wheel body, a cover assembly including a trim ring cover member for disposition at the outer side of the wheel having an inner marginal generally radially inwardly extending flange to seat on the wheel body, and a resilient sheet metal retaining member adapted to be secured to the wheel body and having a radially outer margin for clampingly engaging said trim ring marginal flange, said retaining member being resiliently flexibly tensionable into said clamping engagement.

7. In a wheel structure including a tire rim and a wheel body, a cover assembly including a trim ring cover member for disposition at the outer side of the wheel and having an inner marginal generally radially inwardly extending flange to seat on the wheel body, and a resilient sheet metal retaining member adapted to be secured to the wheel body and having a radially outer margin for clampingly engaging said trim ring marginal flange, said retaining member being resiliently flexibly tensionable into said clamping engagement, the inner portion of said retaining member being formed for engagement by the wheel attaching bolts for securing it to the wheel.

8. In a wheel structure including a tire rim and a wheel body, a cover assembly including a trim ring cover member for disposition at the outer side of the wheel and having an inner marginal generally radially inwardly extending flange to seat on the wheel, and a resilient sheet metal retaining member adapted to be secured to the wheel body and having a radially outer margin for clampingly engaging said trim ring marginal flange, said retaining member being resiliently flexibly tensionable into said clamping engagement, said outer margin of the retaining member being turned back upon itself for reinforcement.

9. In a vehicle wheel structure including a tire rim and a body part, a cover including a trim ring member arranged to cover the tire rim and having a wheel body engaging inner margin, a retaining ring member cooperating with the inner margin of the trim ring member to clamp the same against the wheel body and constructed and arranged for retention on the wheel body, the retaining ring member having means thereon for supporting a hub cap member, and a hub cap member separably supported on said retaining ring member.

10. In a vehicle wheel structure including a tire rim and a body part, a cover assembly comprising a trim ring cover member for substantially concealing the tire rim and having a convergent inner marginal flange providing a juncture groove therewith and arranged for engagement with the wheel body, a retaining member having a radially outer portion separably cooperating with the trim ring member within said juncture groove and retained upon the wheel by engagement with retaining means at the radially inner portion of the wheel body, a hub cap cover member, and means on the retaining member for snap-on pry off retention of the hub cap cover member.

11. In a wheel structure including a body part, a cover retaining member for the outer side of the wheel body part, means for attaching said member to the wheel body part, said member having a shoulder thereon facing generally radially outwardly, and a retaining clip extending to said shoulder and constructed and arranged to secure a cover member against said shoulder.

12. In a wheel structure including a body part, a cover retaining member for the outer side of the body part, said member having a shoulder thereon facing generally radially and having apertures therein, and retaining clips extending through said apertures in the shoulder and constructed and arranged to secure a cover member against said shoulder, said clips being preloaded and including stop means engaging the shoulder for preventing displacement of the clips from the cover retaining position prior to engagement with the cover.

13. In a wheel structure including a wheel body, said body having an annular hump formation, an annulus of sheet material constructed and arranged to fit over the annular hump of the wheel body and having the radially inner and outer margins thereof formed to rest against the wheel body at the radially inner and outer sides of the body hump, the retaining member having an annular hump formation to clear the wheel hump and providing a generally radially facing shoulder, a plurality of spring clips mounted on said retaining member hump and having portions thereof extending through apertures in said shoulder, said spring clips being under preloaded tension tending to withdraw from said shoulder, and stop flanges on said clips engageable with the retaining member to hold the clips against withdrawal from the shoulder.

14. In a wheel structure including a wheel body, a cover retaining member for attachment to the outer side of the wheel body, said retaining member having a generally radially outwardly facing shoulder, a circular cover member having a margin engageable with said shoulder, and spring clips carried by said retaining member for snap-on, pry-off engagement by the margin of said circular cover member and having resilient shoulders thereon for holding the margin of the circular cover member against said radially outwardly facing shoulder in the assembled relationship of the circular cover member with the retaining member.

GEORGE ALBERT LYON.

REFERENCES CITED

The following references are of record in the file of this patent:

UNITED STATES PATENTS

| Number | Name | Date |
| --- | --- | --- |
| 2,166,216 | Lyon | July 18, 1939 |
| 2,183,220 | Horn | Dec. 12, 1939 |
| 2,214,747 | Lyon | Sept. 17, 1940 |
| 2,326,788 | Lyon | Aug. 17, 1943 |